(12) United States Patent
Lee et al.

(10) Patent No.: US 7,598,297 B2
(45) Date of Patent: Oct. 6, 2009

(54) METHOD OF RECLAIMING MULTILAYERED FILM WASTE

(75) Inventors: Young-Chul Lee, Seoul (KR); Myeong-Jun Kim, Cheonan-si (KR); Hyung-Chan Lee, Chonan-si (KR)

(73) Assignee: Korea Institute of Industrial Technology, Chungcheongnam-do (KR)

( * ) Notice: Subject to any disclaimer, the term of this patent is extended or adjusted under 35 U.S.C. 154(b) by 643 days.

(21) Appl. No.: 11/323,103

(22) Filed: Dec. 30, 2005

(65) Prior Publication Data

US 2006/0178442 A1    Aug. 10, 2006

(30) Foreign Application Priority Data

Jan. 24, 2005    (KR) .................... 10-2005-0006157

(51) Int. Cl.
*C08J 11/04*    (2006.01)

(52) U.S. Cl. .......................... 521/40; 521/40.5; 521/47; 521/48; 521/48.5

(58) Field of Classification Search ................... 521/40, 521/40.5, 47, 48, 48.5
See application file for complete search history.

(56) References Cited

U.S. PATENT DOCUMENTS

2003/0125399 A1*    7/2003    Zhang et al. .................. 521/40

\* cited by examiner

*Primary Examiner*—Edward J Cain
(74) *Attorney, Agent, or Firm*—Casimir Jones, S.C.

(57) ABSTRACT

Disclosed is a method of reclaiming a multilayered film which comprises a plastic layer including polyester (PET), polypropylene (PP), and polyethylene (PE) as main components, and an aluminum layer. The method comprises selective dissolution of aluminum, separation using a difference in specific gravity, selective extrusion using a difference in melting point, and selective dissolution using an organic solvent.

10 Claims, No Drawings

METHOD OF RECLAIMING MULTILAYERED FILM WASTE

This Application claims priority to Korean patent application No. 10-2005-0006157, filed Jan. 24, 2005, which is herein incorporated by reference in its entirety.

1. Technical Field

The present invention relates to a method of economically reclaiming multilayered packaging film waste, which comprises plastic film layers of polyester (polyethylene terephthalate, PET), polypropylene (PP), and polyethylene (PE), and an aluminum layer, so that PET, a mixture of PP and PE, and aluminum are separated to be reclaimed.

2. Background Art

Recently, multilayered packaging film, which comprises plastic film layers of PET, PP and PE and an aluminum layer, has been frequently used for various purposes, such as moisture proofing and providing an attractive appearance, during packaging of foodstuffs, and use of the multilayered packaging film is continuously growing. The plastic film layers may be subjected to printing, and an adhesive may be interposed between the film layers. When the multilayered film is used for packaging goods, a layering process, including a plurality of steps, and a printing process such as gravure printing, are conducted. In the layering process or the printing process, inferior products may be generated. In connection with this, the inferior products are almost all discarded. Multilayered packaging film wastes may be partially reclaimed without additional treatment. However, since PET, PP, and PE components are mixed in various ratios, and since an aluminum layer is used, it is difficult to conduct processing; as well, physical properties are poor. Thus, they are used only to produce low-grade plastic goods. Additionally, most multilayered packaging film waste that is discarded by homes is not reclaimed, but disposed of by incineration or burial.

Aluminum is reacted with an alkali or acid aqueous solution to be dissolved in an aqueous solution phase. Generally, a reaction rate of aluminum with an alkali is higher than that of aluminum with an acid. The reaction rate depends on the concentration and temperature of the alkali or acid aqueous solution, and on the rate of diffusion caused by agitation. A reaction equation of the alkali aqueous solution, which is exemplified by sodium hydroxide (NaOH) aqueous solution, and aluminum is as follows.

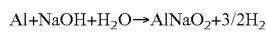

$$Al + NaOH + H_2O \rightarrow AlNaO_2 + 3/2 H_2$$

In other words, aluminum is dissolved in a sodium aluminate state in the aqueous solution, and hydrogen gas is generated as a result of the reaction.

With respect to the three plastics of polyester (PET), polypropylene (PP), and polyethylene (PE) as main components of a multilayered packaging material, polypropylene and polyethylene are compatible with each other due to their similar molecular structure. Thus, they are mixed with each other to some extent, and physical properties of the mixture are fair. PP and PE are called polyolefins in conjunction with an ethylene vinyl acetate (EVA) copolymer, polybutylene, and polyisobutylene, and are frequently used for the same purpose due to similar chemical and electrical properties. Currently, reclaimed PP and PE, which are distributed to homes, are mostly used in a form of mixture of PP and PE. However, since PE and PP both have no compatibility with PET, they are not mixed with PET, and physical properties of a mixture of them are poor. Accordingly, in order to reclaim each plastic, it is very important to separate PE and PP from PET.

DISCLOSURE OF THE INVENTION

The present inventors have continuously conducted studies and experiments into reclamation of multilayered packaging film waste as an important resource without burial or incineration, thereby accomplishing the present invention. Accordingly, an object of the present invention is to provide a method of separating polyester, a mixture of polypropylene and polyethylene, and aluminum as main components of the multilayered packaging film. In the method, in order to reclaim the multilayered packaging film wastes, aluminum from the multilayered film waste is selectively dissolved to induce layer separation, and a mixture of polypropylene layer and polyethylene layer and a polyester layer are separated from each other using the difference in specific gravity. Furthermore, in order to increase the purity of polyester separated using the difference in specific gravity, polypropylene and polyethylene layers contained in the polyester layer are extracted using an organic solvent.

The present invention relates to a method of reclaiming a multilayered film. The method comprises selectively reacting the aluminum layer of the multilayered film with a solvent to separate it from the film through dissolution so that the multilayered film is divided into two or more layers, separating the layer of polypropylene and polyethylene from the polyester layer using the difference in their specific gravity, and extracting polypropylene and polyethylene from the separated polyester layer using an organic solvent in order to increase the purity of polyester separated with the difference in specific gravity.

The method of reclaiming the multilayered film waste according to the present invention comprises a) feeding the pulverized multilayered film waste having an aluminum layer into a reactor to treat the pulverized multilayered film waste with a solution for dissolving aluminum so that the aluminum layer is selectively dissolved, to be separated therefrom; b) separating the pulverized film waste, from which the aluminum layer is separated through dissolution, into a layer of pulverized pieces including polypropylene and polyethylene, having a relatively lower specific gravity as main components, and a layer of pulverized pieces including polyester, having a relatively higher specific gravity as a main component, using a difference in the specific gravity; c) drying the pulverized pieces, which are separated using the difference in the specific gravity and include polyester as the main component, adding the dried pulverized pieces into a reactor, and separating polypropylene and polyethylene therefrom through dissolution by heating the resulting pulverized pieces in conjunction with an organic solvent; and d) recovering an aluminum component, a mixture of polypropylene and polyethylene, and the polyester from the separated materials.

BEST MODE FOR CARRYING OUT THE INVENTION

Hereinafter, a detailed description will be given of a method of reclaiming multilayered packaging film waste according to the present invention.

Multilayered packaging films, which were discarded after distribution in the market or were wasted at the printing factory, were collected, and then analyzed in view of their components using a differential scanning calorimeter (DSC; Perkin Elmer DCS7), an X-ray diffractometer (Rigaku, DMAX2200), and a solvent-extracting method as described below. As a result, PP content was 45-77%, PE content was 20-40%, PET content was 0-50%, and aluminum content was 0.4-1.4%: the contents significantly depended on type thereof. In terms of an average composition of various types of multilayered film waste, PP was about 48%, PE was about 29%, PET was about 22%, and aluminum was about 1%. Nylon 6 was occasionally observed, and its average composition was about 0.5%, which was considered a small amount.

The melting point of the PE used in the multilayered packaging film was measured using the DSC for detailed analysis, resulting in the finding that it consisted mostly of LDPE and included LLDPE (linear low density polyethylene) or a copolymer of ethylene such as EVA (ethylene vinyl acetate) and another monomer, or even HDPE.

The multilayered packaging film waste is pulverized using a pulverizer to form polygonal pulverized pieces having a side length of 1-50 mm and an irregular shape. A predetermined amount of pulverized pieces are fed into a reactor, an alkali aqueous solution is added into the reactor in the amount suitable to immerse the pulverized pieces therein, and agitation is conducted using an agitator at a predetermined revolving rate, for example, 10-500 rpm. The alkali aqueous solution is exemplified by a NaOH aqueous solution, a KOH aqueous solution, a $Ca(OH)_2$ aqueous solution, or a LiOH aqueous solution. The temperature of the alkali aqueous solution is set between a normal temperature and a boiling point, and then agitation is conducted for 5 min-2 hours. Dissolution time of aluminum depends on the concentration and temperature of the alkali aqueous solution, the shape of the agitator, and the agitation rate. The dissolution rate of aluminum increases when the concentration and the temperature of the alkali aqueous solution are high and the agitation is well conducted. The concentration of the alkali aqueous solution used may be 0.1% to a saturated solution. A concentration of 1% or more is preferable since the proper dissolution rate is assured at that concentration. It is preferable that the temperature of the alkali aqueous solution be a normal temperature or 20□ or higher at a high concentration of 5% or more, and that the temperature of the aqueous solution be from 60□ to the boiling point at a low concentration of less than 5%. In a process of extracting an aluminum layer using the alkali aqueous solution, polypropylene, polyethylene, and polyester layers are not dissolved. Since the aluminum layer is typically interposed between the layers, the multilayered film is mainly divided into two film layers after the aluminum layer is removed. Sometimes, it is observed that the multilayered film from which the aluminum layer is removed is divided into 3-4 layers. The reason is believed that an adhesive component interposed between the film layers is dissolved by the alkali aqueous solution.

The reactor for treating aluminum is provided with a typical agitator and heater, and has an inlet and an outlet for the pulverized pieces of a packaging material and for a solvent. It may have both a closed system and an open system. When a hydrogen gas is collected, it must have the closed system, and also have a condenser for condensing steam at an upper part thereof and on-off valves at the inlet and the outlet thereof. A pipe may be provided at an upper part of the condenser to condense steam and then remove it, so as to be useful as a discharge pipe of the hydrogen gas. Surfaces of the reactor, the agitator, the pipe, and the valves, which come into contact with the solvent, should neither react with the solvent nor be dissolved in the solvent. Thus, they are made of stainless steel in the case of the alkali aqueous solution, and of glass, fiber-reinforced plastics, or special alloys in the case of the acid aqueous solution.

The reaction is stopped when the aluminum layer of the multilayered packaging film is no longer observed. After the completion of the reaction, the pulverized pieces of the multilayered film remaining after the aluminum layer is dissolved and the alkali aqueous solution are discharged from the reactor, and are separated from each other using a solid-liquid separator, such as a centrifuge provided with a filter cloth or mesh. The separated alkali aqueous solution is stored to be reused, and, if reactivity to aluminum is reduced in the course of forming a saturated solution, the aluminum compound which is dissolved in the alkali aqueous solution is separated using a predetermined process, such as neutralization, in a solid phase of aluminum hydroxide ($Al(OH)_3$). The separated pulverized pieces of the multilayered film are washed with water, and the washing is repeated a few times until water used for the washing becomes pH neutral (pH 7).

Densities of PE, PP, and PET slightly depend on crystallinity, and are in general, about 0.91-0.97, 0.90-0.91, and 1.33-1.42, respectively. Accordingly, it is possible to separate a mixture layer of PE and PP from a PET layer due to a difference in specific gravity, using a solution having specific gravity of 0.97-1.33. Therefore, if the specific gravity of the alkali aqueous solution used in the process for dissolving aluminum is 1.0-1.33, the separation process using the specific gravity difference can be conducted immediately after the process for dissolving aluminum. In connection with this, the pulverized pieces are washed until the water used to wash the pieces becomes pH neutral after the separation process using the specific gravity difference. Since PE and PP are similar to each other in density, it is difficult to separate them using a difference in specific gravity.

The separation using the specific gravity difference may be conducted using water having specific gravity of about 1.0. The pulverized pieces, which float on water because their specific gravity is less than 1, include the PP and PE layers as main components, and one or more films layered therein. Components that sink in water due to having a specific gravity higher than 1 are the PET film and the multilayered film which is not separated from the PET film. The pulverized pieces may be undesirably separated using the specific gravity difference. For example, if air bubbles or oil components are attached to a surface of the PET layer having specific gravity of about 1.33-1.42, or if the PET layer is positioned on a plurality of PP or PE films, it will float on water. Furthermore, if the PP or PE layer having specific gravity of about 0.9-0.97 is not separated from the PET layer having a higher specific gravity, or is positioned under a plurality of PET layers, it will sink in water. These mistakes can be avoided through addition of a surfactant or through repetition of the separation process using the specific gravity difference.

Melting points of PE, PP, PET, and aluminum are respectively about 100-135□, 155-165□, 245-275□, and 660□. An extruder is frequently used to process PE or PP, and a typical extrusion condition includes an internal temperature of the extruder of 205-260□. In an operation condition in which the maximum temperature of the extruder is 220□ or less, among PE, PP, and PET films in the extruder, the PET film is not melted, moves in a solid phase state, and is caught by a screen or mesh provided on a breaker plate between a screw and a die.

Using the above results, the pulverized pieces, which are separated during the separation process using the specific gravity difference, have low specific gravity, and include the PE and PP layers as main components, are dried, and the extrusion is conducted using an extruder having a screen, at an operational temperature of 220□ or lower to extrude only PE and PP, so that they are processed to form pellets or extrudates.

The hole size of the mesh or screen may be from 20-mesh to 200-mesh. Impurities which are not melted, such as PET, are more completely filtered out as the hole size is reduced. In connection with this, the PET film caught by the mesh or screen reduces the extrusion rate, thus it must be frequently removed. When using the screen or mesh provided on the breaker plate, the extrusion process is stopped during the removal of the undissolved PET film. If a continuous-type screen changer is used, the undissolved PET film can be removed without stopping the extrusion process. The removed impurities, such as PET, are in a solid state, and include the PET film pulverized pieces as a main component, and a balance of PE and PP components. Hence, the PET film is separated from PE and PP through a process of extracting PE and PP using an organic solvent, as described later.

The pulverized pieces, which are separated during the separation process using the specific gravity difference and have high specific gravity, include the PET film separated in the process for separating aluminum and the multilayered film not separated from the PET film as main components. Materials other than the PET film reduce reclamation, thus they must be separated from the PET film. The extrusion temperature of PET is about 290□ or higher, which is higher than melting points of PE and PP. Accordingly, PE and PP are in a liquid state in the extruder for processing PET, thus they are not caught by the mesh provided on the breaker plate. Hence, it is impossible to separate PE and PP in the course of extruding the PET film.

PE and PP are selectively dissolved using an organic solvent to produce the pure PET film. Examples of an organic solvent capable of being used in the dissolution process include hydrocarbons, such as xylene and toluene, halogenated hydrocarbons, esters, and ketones. They may be used alone or in a mixture form. PE and PP may be sequentially or simultaneously extracted. For example, when using xylene as the organic solvent, PE frequently used in a multilayered packaging material is dissolved in xylene at 70-95□, and PP frequently used in the multilayered packaging material is only partially dissolved in xylene at 95□ or less but is completely dissolved in xylene at 100□ or higher. PET is not dissolved at all in xylene at any temperature, even at boiling point (about 135□), at atmospheric pressure.

Hence, the pulverized pieces, which include PET separated during the process using the specific gravity difference as a main component, are put into a mesh tub provided in a reactor, xylene is fed into the reactor so as to immerse the pulverized pieces therein, and the pulverized pieces are agitated in the mesh tub for a predetermined time (10 min-2 hours) while the temperature of xylene is maintained at 70-95□ to selectively dissolve PE in xylene. The mesh tub has a structure capable of enduring the weight of the contents, has side and bottom surfaces wrapped by the meshes (10 to 200 meshes), and is designed so as to be fixed in the reactor.

PE passes through the mesh tub while it is dissolved in xylene at 70-95□, and then is discharged from the reactor. However, PP and PET are not dissolved in xylene, thus they remain in the mesh tub. After xylene, including PE dissolved therein, is discharged from the reactor, fresh xylene at 100□ or higher continuously comes into contact with the pulverized pieces of PP and PET, mixed with each other in the mesh tub, and agitation is conducted for a predetermined time (10 min-2 hours) to selectively dissolve PP. After a xylene solution, in which PP passing through the mesh tub is dissolved, is discharged from the reactor, only pure PET remains in the mesh tub.

If it is required that PE and PP are simultaneously separated from PET, the mixed pulverized pieces of PE, PP, and PET are put into the mesh tub provided in the reactor, xylene is fed into the reactor so as to immerse the pulverized pieces therein, and the pulverized pieces are agitated in the mesh tub for a predetermined time (10 min-2 hours) while a temperature of xylene is maintained at 100□ or higher to simultaneously dissolve PE and PP. After the dissolution is completed, the xylene solution in which PE and PP are dissolved is discharged from the reactor to separate undissolved PET therefrom.

The reactor used to conduct the dissolution process must be provided with a condenser for preventing the organic solvent from being vaporized from the reactor, an agitator, a heater, and the mesh tub having a predetermined size to be fixed therein. The reactor and the agitator, which come into contact with the organic solvent, must be formed so as not be dissolved in the organic solvent nor to react therewith.

The organic solvent solution, in which separated polyethylene and polypropylene are dissolved, is dried to vaporize the organic solvent, thereby it is possible to obtain polyethylene and polypropylene containing no polyester component, or a mixture thereof. The film, which is not dissolved in xylene and thus remains in the mesh tub, consists mostly of polyester, and is dried to be reclaimed.

A better understanding of the present invention may be obtained through the following examples which are set forth to illustrate, but are not to be construed as the limit of the present invention.

EXAMPLE 1

Six multilayered films, which comprised aluminum layers and were printed for packaging, were cut in a square shape of 3 mm×3 mm, and the aluminum layers were dissolved in a 10% sodium hydroxide (NaOH) aqueous solution at 90□. The time that was taken to completely dissolve each aluminum layer is described in Table 1. After the aluminum layers were completely dissolved, the films were generally divided into two or more layers. The reason the multilayered film was divided into three or more layers is believed to be that an adhesive component interposed between layers, as well as the aluminum, is dissolved by an alkali aqueous solution. After the aluminum layers were completely dissolved, pulverized products were filtered using a sieve, washed with water a few times, and immersed in water having specific gravity of about 1.0 so as to be divided into a layer floating on water and another layer sinking in water. Melting temperature was measured using a differential scanning calorimeter (DSC; Perkin Elmer DSC7) to confirm that the layer floating on water consisted mostly of PP and PE, and that the layer sinking in water consisted mostly of PET. The nondivided pulverized products were classified into the products floating on water and the products sinking in water according to total specific gravity. The multilayered packaging films used in the present example were roughly classified into two categories: samples 1, 2, and 3 of Table 1, which comprised PET, PP, PE, and the aluminum layer, and samples 4, 5, and 6 of Table 1, which comprised PP, PE, and the aluminum layer. The dissolution time of aluminum in the multilayered film including the PET layer was shorter than that of the multilayered film lacking a PET layer.

TABLE 1

| Sample | Dissolution time of aluminum (min) | Number of Separated film layers | Separation process using a difference in specific gravity | |
|---|---|---|---|---|
| | | | Layers floating on water | Layers sinking in water |
| 1 | 5 | 3 | 2 | 1 |
| 2 | 5 | 3 | 2 | 1 |
| 3 | 10 | 3 | 2 | 1 |
| 4 | 30 | 3 | 3 | 0 |
| 5 | 30 | 2 | 2 | 0 |
| 6 | 30 | 3 | 3 | 0 |

EXAMPLE 2

Waste, in which various multilayered packaging films were mixed with each other, was pulverized, and an aluminum layer was dissolved in a 10% sodium hydroxide (NaOH) aqueous solution at 90□ for 30 min. The pulverized pieces were separated from the NaOH aqueous solution, and washing was conducted using water until surfaces of the pulverized pieces, which were stained with the NaOH aqueous solution, became pH neutral (pH 7). The pulverized pieces in which the aluminum layer was completely dissolved were classified into two or more film layers.

The pulverized pieces were dipped into water at normal temperature to separate the pieces sinking in water due to specific gravity higher than that of water (specific gravity 1), from the pieces floating on water, due to specific gravity lower than that of water. The pulverized pieces that had specific gravity higher than that of water at normal temperature were about 25% in weight, and wrapped in mesh so that they could not slip therefrom. They were extracted in xylene at 90□ for about 30 min, dried, and weighed to calculate a content of PE component. The plastics which were extracted using xylene at 90□ were dried and analyzed using a differential scanning calorimeter, resulting in confirmation that they included PE consisting mostly of LDPE as a main component and a small amount of PP, but did not have any other plastics, such as PET. Subsequently, the pulverized pieces that remained in the meshes after the extraction using xylene at 90□ were dissolved in xylene at 130□ for about 30 min, dried, and weighed to calculate contents of PP and PET components. The plastic components that were extracted using xylene at 130□ were dried and analyzed using a DSC, resulting in the confirmation that PP was 99% or more. After the extraction was conducted using xylene twice (90□ and 130□), the pulverized pieces were transparent or had coats printed thereon, and included 99% or more PET. The plastic components of the pulverized pieces floating on water were analyzed through the above-mentioned extraction method using xylene, and the results are described in Table 2 in conjunction with the analysis results of the pulverized pieces sinking in water. The pulverized pieces floating on water included about 96% PE and PP and about 4% PET. The pulverized pieces sinking in water included about 75% PET and about 25% PE and PP.

TABLE 2

| Pulverized piece samples, from which aluminum was removed | Content(%) | Ratio of plastic components (%) | | | |
|---|---|---|---|---|---|
| | | PE | PP | PET | Total |
| Pulverized pieces floating on water | 75 | 34 | 62 | 4 | 100 |
| Pulverized pieces sinking in water | 25 | 18 | 7 | 75 | 100 |

EXAMPLE 3

The multilayered film pulverized pieces of example 2, in which the aluminum layer was dissolved, were subjected to a separation process using a difference in specific gravity using saltwater having specific gravity of 1.2. The layer floating on the saltwater and the layer sinking in the saltwater were about 95% and 5%, respectively. Each of the two layers was washed with water to remove salt components, dried, and wrapped in mesh to be extracted with xylene at 130□ for about 30 min, and the weight change was evaluated to calculate contents of PET and a mixture of PE and PP. The results are described in Table 3. PE and PP were both dissolved in xylene at 130□, but the PET was not dissolved. From a comparison of Table 3 with Table 2, it can be seen that the PET content of the pulverized pieces sinking in the saltwater having specific gravity of 1.2 is higher than that of the pulverized pieces sinking in water having specific gravity of 1.0.

TABLE 3

| Pulverized piece samples, from which aluminum was removed | Content(%) | Ratio of plastic components (%) | | |
|---|---|---|---|---|
| | | PE and PP | PET | Total |
| Pulverized pieces floating on salt water (sp. Gr. 1.2) | 95 | 81 | 19 | 100 |
| Pulverized pieces sinking in salt water (sp. Gr. 1.2) | 5 | 4 | 96 | 100 |

EXAMPLE 4

The pulverized pieces of example 2, which floated on water, were dried and extruded using a single-screw extruder. Two mesh sheets of 30-mesh and 60-mesh were layered on a breaker plate between a screw and a die for the extrusion. The temperature of the extruder was 180-220□, depending on its position. Extruded plastic strands were dipped in cold water, cut to a predetermined size, and processed into pellets. The pellets were dried and compressed to form a sheet, and the melting point and heat of fusion were measured using a DSC to analyze components thereof. The analyzed results are described in the following Table 4. The extruded plastic included 99% or more PP and PE, with a PET content of less than 1%. The PET content of the pulverized pieces before the extrusion was 4%, but the PET content of the extruded strands was less than 1%. In other words, it is believed that 75% of the PET film, which was contained in the pulverized pieces floating on water, was caught by the mesh on the breaker plate, and the remaining 25% passed through the mesh.

TABLE 4

| Melting point(□) | Content obtained through analysis of fusion peak(%) | Note |
| --- | --- | --- |
| 116 | 35 | PE |
| 165 | 64 | pp |
| 256 | 1 | PET |

INDUSTRIAL APPLICABILITY

According to a reclamation method of the present invention, multilayered packaging film waste, which is conventionally buried or incinerated, can be divided into individual components for reclamation, and separated polyester, polypropylene, polyethylene, and aluminum compounds can be used, depending on the purpose, like novel products.

The invention claimed is:

1. A method of reclaiming a multilayered film waste, which includes plastic layers of polypropylene, polyethylene, and polyester layers, and an aluminum layer, comprising:
    a) feeding the pulverized multilayered film waste having the aluminum layer into a reactor to treat the pulverized multilayered film waste with a solution for dissolving aluminum so that the aluminum layer is selectively dissolved to be separated from the film;
    b) separating the pulverized film waste, from which the aluminum is separated through dissolution, into a layer of pulverized pieces including polypropylene and polyethylene, having low specific gravity, as main components, and a layer of pulverized pieces including polyester, having high specific gravity, as a main component, using a difference in the specific gravity;
    c) drying the pulverized pieces which are separated using the difference in the specific gravity and include polyester as the main component, adding the dried pulverized pieces into the reactor, and separating polypropylene and polyethylene therefrom through dissolution by heating the resulting pulverized pieces in conjunction with an organic solvent; and
    d) recovering an aluminum component, a mixture of polypropylene and polyethylene, and polyester from said separated materials.

2. The method as set forth in claim 1, wherein the solution for dissolving the aluminum layer in step (a) is one or more alkali aqueous solutions selected from the group consisting of NaOH aqueous solution, KOH aqueous solution, $Ca(OH)_2$ aqueous solution, and LiOH aqueous solution.

3. The method as set forth in claim 1, wherein the separation of the pulverized pieces using the difference in specific gravity in step (b) is conducted using a liquid having the specific gravity of 0.97-1.33.

4. The method as set forth in claim 1, wherein the pulverized pieces that are separated using the difference in the specific gravity, include polypropylene and polyethylene as the main components, and have the low specific gravity, are dried and processed using an extruder, in which a maximum internal temperature is 220° C. or lower, in such a way that a screen or a continuous-type screen changer is provided on a breaker plate between a screw and a die to filter polyester (PET) film which is not melted in the extruder while polyethylene and polypropylene are processed to form pellets or extrudates.

5. The method as set forth in claim 1, wherein the organic solvent used in step (c) is selected from the group consisting of hydrocarbons, including xylene and toluene, halogenated hydrocarbons, esters, ketones, and a mixture thereof.

6. The method of claim 1, wherein the separating of polypropylene and polyethylene from the pulverized pieces, which include polyester as the main component and have the high specific gravity, comprises:
    heating the pulverized pieces in conjunction with the organic solvent to 70-95° C. so that polyethylene is dissolved to be separated therefrom, and subsequently treating the remaining pulverized pieces using the organic solvent at 100° C. to a boiling point, so that polypropylene is dissolved to be separated from a undissolved polyester (PET) film layer; or
    heating the pulverized pieces in conjunction with the organic solvent to 100° C. to the boiling point so that polyethylene and polypropylene are simultaneously dissolved, to be separated from the polyester film layer.

7. The method as set forth in claim 6, wherein the organic solvent is xylene.

8. The method as set forth in claim 2, further comprising collecting hydrogen generated through a reaction of aluminum and alkali in step (a).

9. The method of claim 5, wherein the separating of polypropylene and polyethylene from the pulverized pieces, which include polyester as the main component and have the high specific gravity, comprises:
    heating the pulverized pieces in conjunction with the organic solvent to 70-95° C. so that polyethylene is dissolved to be separated therefrom, and subsequently treating the remaining pulverized pieces using the organic solvent at 100° C. to a boiling point, so that polypropylene is dissolved to be separated from a undissolved polyester (PET) film layer; or
    heating the pulverized pieces in conjunction with the organic solvent to 100° C. to the boiling point so that polyethylene and polypropylene are simultaneously dissolved, to be separated from the polyester film layer.

10. The method as set forth in claim 9, wherein the organic solvent is xylene.

* * * * *